(12) United States Patent  
Ohta (10) Patent No.: US 6,341,019 B1  
(45) Date of Patent: Jan. 22, 2002

(54) METHOD AND APPARATUS FOR PROCESSING AN IMAGE

(75) Inventor: Kenichi Ohta, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/088,757

(22) Filed: Jun. 2, 1998

(30) Foreign Application Priority Data

Jun. 12, 1997 (JP) .............................................. 9-155066

(51) Int. Cl.⁷ .......................... G06K 15/02; H04N 1/48; H04N 1/56
(52) U.S. Cl. ........................ 358/1.9; 358/521; 358/534; 358/523
(58) Field of Search ........................ 358/1.9, 521, 530, 358/534, 455, 456, 458, 466, 298, 523; 382/167, 251, 252, 270

(56) References Cited

U.S. PATENT DOCUMENTS

| | | | |
|---|---|---|---|
| 4,926,268 A | * 5/1990 | Kawamura et al. ......... | 358/458 |
| 5,031,179 A | 7/1991 | Yoshida et al. | |
| 5,245,354 A | 9/1993 | Ono et al. | |
| 5,282,059 A | * 1/1994 | Fukushima et al. ......... | 358/456 |
| 5,313,286 A | 5/1994 | Sugiura et al. ............. | 358/443 |
| 5,315,415 A | 5/1994 | Kawai et al. | |
| 5,488,672 A | * 1/1996 | Mita .......................... | 382/167 |
| 5,760,922 A | * 6/1998 | Kojima ...................... | 358/458 |

OTHER PUBLICATIONS

"An Adaptive Algorithm For the Spatial Grey Scale" R. Floyd et al. SID 75 Digest, pp. 36–67.

* cited by examiner

*Primary Examiner*—Scott Rogers  
(74) *Attorney, Agent, or Firm*—Fitzpatrick, Cella, Harper & Scinto (57) ABSTRACT

The invention provides a method and apparatus for processing an image in such a manner that excellent color reproduction is achieved regardless of whether the image is reproduced from m-level data or n-level data. The image processing method and apparatus has first and second modes, wherein in the first mode m-level color data is converted to n (n<m)-level color data, and wherein in the second mode n-level color data is first converted to m-level color data and then converted to n-level color data.

7 Claims, 3 Drawing Sheets

METHOD AND APPARATUS FOR PROCESSING AN IMAGE

BACKGROUND OF THE INVENTION

1. Field of the Invention

The present invention relates to a method and apparatus for processing an image, including the process of converting the image to an n-level image, and also to a recording medium.

2. Description of the Related Art

A color copying machine is known which makes a copy of an original document using four color component signals C (cyan), M (magenta), Y (yellow), and Bk (black) in the form of two-level signals generated from a digital image signal of the document.

Figure 2:
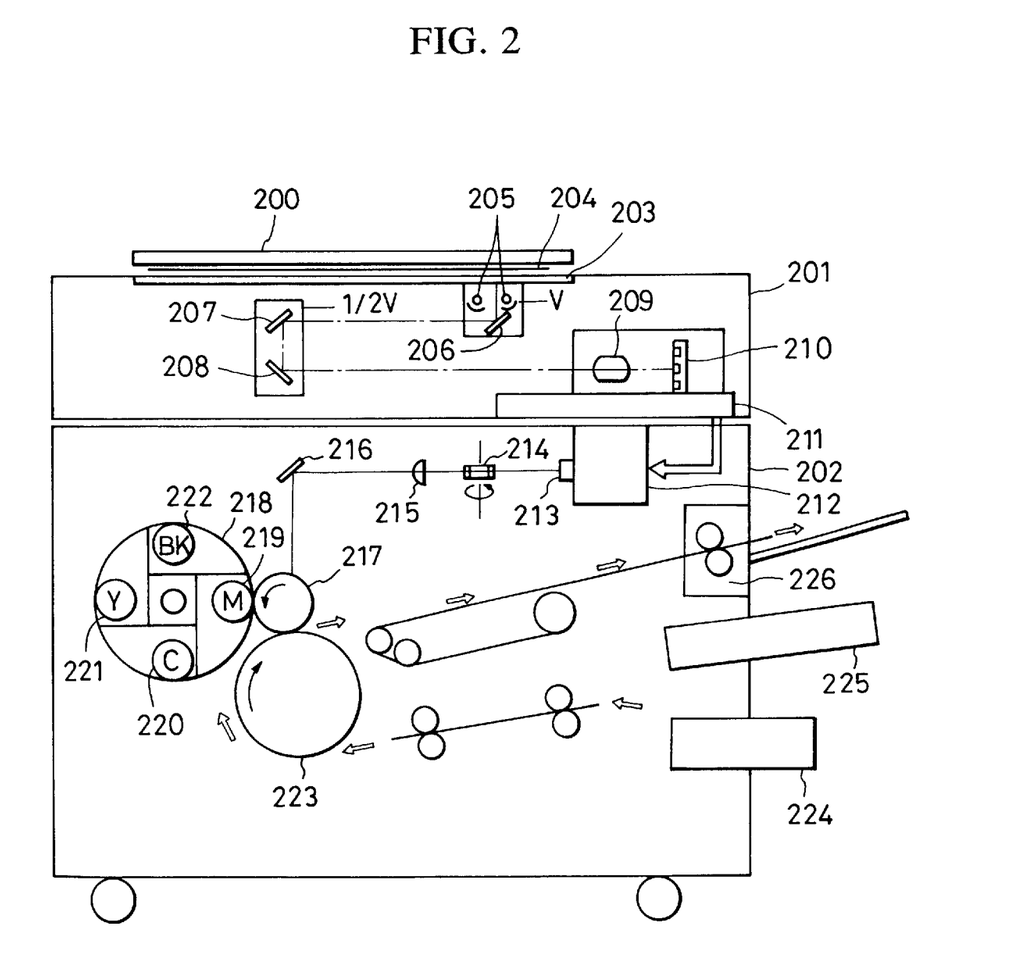
FIG. 2 is a schematic diagram illustrating a color copying machine.

FIG. 2 is a schematic diagram illustrating such a type of color copying machine. In FIG. 2, an image scanner 201 reads image data from a document and performs digital signal processing on the image data. In accordance with the document image data obtained via the image scanner 201, a printer 202 outputs a full-color image on paper.

In the image scanner 201, a document 204 is placed on a document glass plate (hereinafter referred to as a platen) 203, and a mirror-surface pressure plate 200 is placed on the document 204. The document 204 is illuminated by lamps 205. Light reflected from the document 204 is directed by mirrors 206, 207, and 208 to a lens 209 which in turn focuses the light onto a three-line solid state image sensor (hereinafter referred to as a CCD) 210 so that an image of the document 204 is formed on the CCD 210. A full-color image signal including red (R), green (G), and blue (B) components is generated by the CCD 210 and sent to a signal processor 211. The lamps 205 and the mirror 206 are moved at a speed v and the mirrors 207 and 208 at a speed v/2 in a direction perpendicular to the direction of electric scanning performed by the line sensor thereby scanning (secondary-scanning) the whole surface of the document. The image of the document 204 obtained by the scanning has a resolution of 400 dpi (dots per inch) in both primary and secondary scanning directions.

The signal processor 211 performs an electronic process on the image signal obtained by the scanning so as to decompose the image signal into magenta (M), cyan (C), yellow (Y), and black (Bk) components. The resultant color component signals are sent to the printer 202. The respective color component signals M, C, Y, and Bk are converted to two-level signals having a value of either 0 or 1 by means of a known binarization technique such as an error diffusion method. When the document is scanned by the image scanner 201, one of color component signals M, C, Y, and Bk is generated and sent to the printer 202. Thus, the document must be scanned four times to obtain a printed image.

In the error diffusion method, as disclosed for example in a paper titled "An adaptive algorithm for the spatial gray scale" (R. Floyd and L. Steinberg, SID 75 Digest, pp.36–67), multilevel image data of a pixel of interest is converted to two-level data (representing either a black or white level), and the error of the two-level data relative to the original multilevel image data is weighted according to a predefined rule. The error is diffused by adding the weighted error to the data of pixels neighboring of the pixel of interest. In this method, the original multilevel image data can be converted to two-level data while preserving the density of the original image. The conversion to two-level data is performed independently for each of color component signals M, C, Y, and Bk.

The image signal including the color component signals M, C, Y, and Bk transmitted from the image scanner 201 is applied to a laser driver 212. In response to the image signal, the laser driver 212 drives a semiconductor laser 213 so that the optical output of the semiconductor laser 213 is modulated in accordance with the color component signals. When the image signal has a value equal to 0 the laser is not turned on, but the laser is turned on when the image signal has a value equal to 1. Thus, two-level image data is written on a photosensitive drum 217 depending on whether the image signal is equal to 0 or 1. The laser beam scans the photosensitive drum 217 via a polygon mirror 214, an f-2 lens 215, and a mirror 216. As in the reading operation, the writing operation is also performed so that the written image has a resolution of 400 dpi (dots per inch) in both primary and secondary scanning directions.

There is also provided a rotating developing device 218 including a magenta developing unit 219, a cyan developing unit 220, a yellow developing unit 221, and a black developing unit 222. The four developing units alternately come into contact with the photosensitive drum 217. The electrostatic latent image formed on the photosensitive drum is developed with toner. In the developing process, toner is put on those pixels which are exposed to the laser beam, while no toner is put on those pixels which are not exposed to the laser beam. Thus, a toner image corresponding to the two-level image data written on the drum is created.

Paper is fed from a paper cassette 224 or 225 toward a transfer drum 223. The paper is wound around the transfer drum 223, and the image developed on the photosensitive drum 217 is transferred to the paper.

The image transfer is performed successively for four colors M, C, Y, and Bk. The paper is then passed through a fixing unit 226 so as to fix the toner to the paper. The paper is then fed out.

In the color copying machine constructed in the above-described manner, the image signal which has been converted to two-level signal for each color component may be temporarily stored in a buffer memory so that the image may be printed at a desired arbitrary time after completion of the image reading process. This makes it possible to print an image for example after performing 90°-rotation on the image data stored in the buffer memory, or print a composite image by combining a plurality of pages into one page.

However, when the printed image has a density higher or lower than the expected density, or when the color of the printed image is different from the expected color, it is difficult to make a correction because the image signal has already been quantized to two levels, that is, either a white or black level, for each color component.

SUMMARY OF THE INVENTION

It is an object of the present invention to provide a method for processing an image in such a manner that excellent color reproduction is achieved regardless of whether the image is reproduced from m-level data or n-level data (where m and n are integer).

It is another object of the present invention to provide a method for processing an image, in which a desired color correction may be made on n-level data.

According to one aspect of the present invention, there is provided a method of processing an image, having first and second modes, wherein in the first mode m-level color data is converted to n (n<m)-level color data, and wherein in the second mode n-level color data is first converted to m-level color data and further converted to n-level color data.

According to another aspect of the present invention, there is provided a method of processing an image, including the steps of: mannually inputting correction information, setting a look-up table associated with conversion to m-level data in accordance with the correction information, and converting n (n<m)-level data to m-level data using the set look-up table.

These and other features and objects will become apparent from the following detailed description in conjunction with the accompanying drawings.

DESCRIPTION OF THE PREFERRED EMBODIMENTS

First Embodiment

An embodiment of the invention is described below with reference to the accompanying drawings.

Figure 1:
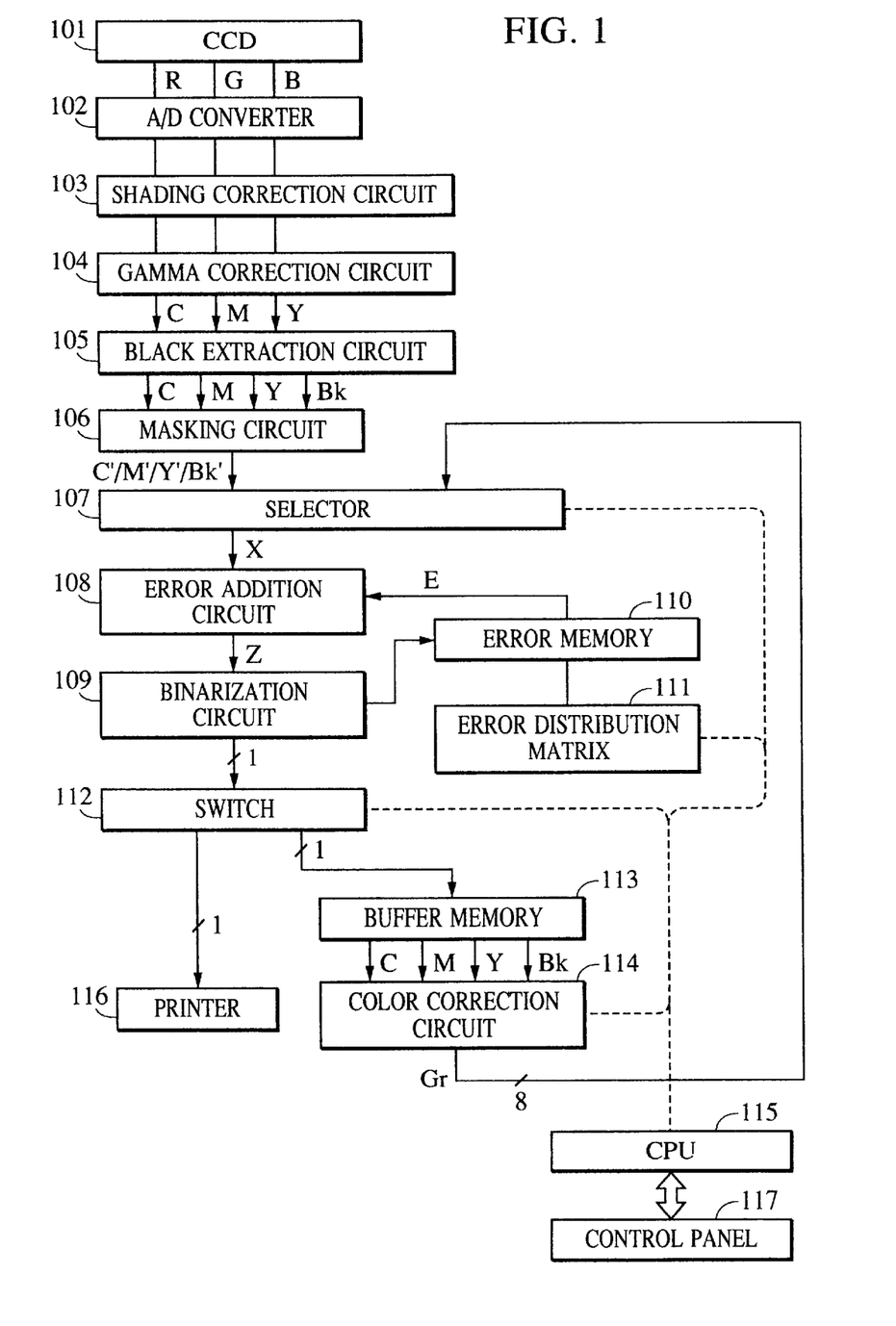
FIG. 1 is a block diagram illustrating an embodiment of the invention.

FIG. 1 is a block diagram illustrating an image processing apparatus according to the first embodiment of the invention. This image processing apparatus has a general construction similar to the copying machine shown in FIG. 2. That is, the apparatus includes a reader and a printer connected to each other. An image signal read by a CCD is sent to the printer after being subjected to known digital signal processing. The printer reproduces an image by performing laser exposure, development, transfer, and fixing. The block diagram of FIG. 1 illustrates the details of a signal processor which is used instead of a signal processor 211, shown in FIG. 2, for converting an image signal sensed via the CCD to two-level data and outputting the resultant two-level data to the printer.

A CCD 101 senses an image of a document pixel by pixel and outputs color component signals in analog form usually including red (R), green (G), and blue (B) components. An A/D (analog-to-digital) converter 102 converts the output signals of the CCD to digital signals. A shading correction circuit 103 corrects variations in the image data caused by a variation in the luminous intensity of a document illumination lamp or variations in the sensitivity of the CCD. A gamma correction circuit 104 performs a logarithmic transformation on the output signals of the CCD representing the brightness of R, G, and B so as to generate signals representing the densities of complementary colors, that is, C (cyan), M (magenta), and Y (yellow). A black extraction circuit 105 detects the lowest value of the C, M, and Y signals, and generates a Bk (black) signal. A masking circuit 106 performs a color correction process, called masking, on the C, M, Y, and Bk signals, depending on the characteristics of a recording medium. In practice, corrected color component signals C', M', Y', and Bk' are generated by performing a matrix conversion shown below.

$$\begin{pmatrix} C' \\ M' \\ Y' \\ B'k \end{pmatrix} = \begin{pmatrix} A_{11} & A_{12} & A_{13} & A_{14} & A_{15} & A_{16} & A_{17} & A_{18} \\ A_{21} & A_{22} & A_{23} & A_{24} & A_{25} & A_{26} & A_{27} & A_{28} \\ A_{31} & A_{32} & A_{33} & A_{34} & A_{35} & A_{36} & A_{37} & A_{38} \\ A_{41} & A_{42} & A_{43} & A_{44} & A_{45} & A_{46} & A_{47} & A_{48} \end{pmatrix} \begin{pmatrix} C \\ M \\ Y \\ Bk \\ C \times M \\ C \times Y \\ M \times Y \\ Bk \times Bk \end{pmatrix}$$

where the $A_{ij}$ denote predefined coefficients, and C X M, C X Y, . . . , represent product terms each including two of color component signals C, M, Y, and Bk.

In the calculation of C', M', Y', and Bk', the masking circuit 106 is not necessarily required to calculate all of these color component signals at the same time. In practice, only one color component signal to be output to the printer is calculated at one time. In the present apparatus, images of four color components are binarized, exposed, developed, transferred, and fused in the order M, C, Y, and Bk, and thus the color correction is performed in the same order so that the corrected color component signals are output in the order M', C', Y' and Bk'.

A selector 107 selects an input signal to be applied to the following binarization circuit. When a copy of a document image is made in a normal operation, the selector 107 selects the output of the masking circuit 106 (one of M', C', Y', or Bk') and transfers the selected signal directly to an error addition circuit 108. The error addition circuit 108 adds a quantization error, produced in a binarization process performed by a binarization circuit 109, to the input signal. The binarization circuit 109 converts the input signal to a two-level signal using the error diffusion method which is known in the art as described above. The resultant two-level signal having a value equal to either 0 or 1 is applied to a switch 112. A binarization error produced in the above binarization process is temporarily stored in an error memory 110. The error data stored in the error memory 110 is distributed among neighboring pixels in accordance with an error diffusion matrix 111 when the neighboring pixels are binarized later. The distributed errors are sent to the error addition circuit 108 and added to the neighboring pixels.

When the sensed image of the document is temporarily stored in the buffer memory, the switch is operated so that the output of the switch 112 is connected to the buffer memory 113. One or more pages of two-level signals of M, C, Y, and Bk components of the document image are stored in the buffer memory 113.

When the image data stored in the memory is output, the contents of the buffer memory 113 are transferred to the selector 107 via a color correction circuit (described later) 114. In this case, unlike in the normal copying operation, the signal from the color correction circuit 114 is applied via the selector 107 to the error addition circuit and then to the binarization circuit 109. Binarization is performed in a similar manner to the normal copying operation, and the binarized data is transferred to a printer 116 via the switch 112.

The operation of the selector for selecting the input signal and the operation of the switch 112 are performed under the control of a CPU 115. A user can enter commands and data to the CPU 115 via a control panel 117.

The color correction performed by the color correction circuit 114 is described below.

In the operation mode in which the document image is temporarily stored in the buffer memory, the data is stored after completion of the binarization process because the binarized (two-level) data needs less memory area than the multilevel data.

In the error diffusion method, the image data is binarized so that the average density of the binarized image in the neighborhood of a pixel of interest becomes equal to that of the original document image. That is, in the binarization using the error diffusion method, the density of the image is preserved by converting the density of the original document image to the density of dots.

In the case where printing is performed using the two-level image data stored in the memory, when it is desired to modify the color tone, it is required to change the spatial density distribution of color dots represented by the two-level data, because the printer can only print or do not print color dots of the respective color components.

To meet the above requirement, the color correction circuit 114 modifies the color tone as follows.

The method of generating two-level data and storing it in the buffer memory is described first. The multilevel data associated with each color component of the original document image is applied to the error addition circuit 108 and then to the binarization circuit 109 shown in FIG. 1. The multilevel data is represented, for example, by an 8-bit digital signal. If an 8-bit digital signal is employed to represent each pixel, the brightness of the pixel is represented by an integer within the range of 0 to 255.

If the multilevel data of one color component M, C, Y, or Bk of a pixel of interest is denoted by X, and the error signal distributed to that pixel from a pixel which has been already binarized is denoted by E, then the arithmetic operation performed by the error addition circuit can be written as $$Z=X+E$$

The result Z is applied to the binarization circuit. The binarization circuit compares Z with a predetermined threshold value Th (usually equal to 128).

If Z>Th, then a two-level signal Bi=1 is output to the switch 112 and a binarization error (=Z−255) is stored in the memory 110.

If Z≦Th, a two-level signal Bi=0 is output to the switch 112 and a binarization error (=Z−0) is stored in the memory 110.

Because the operation is now being performed in the memory storage mode, the switch 112 transfers the generated two-level signal Bi to the buffer memory 113.

If the above process is performed over one page of document image, two-dimensional two-level image signals Bi (=Bi(x, y) where x and y denote two-dimensional pixel coordinates) are stored in the buffer memory. The above process is performed for each of four color component signals M, C, Y, and Bk so as to store one page of color image signals in the buffer memory.

The one page of image data stored in the buffer memory is then subjected to color correction, and the printer outputs an image using the corrected data as described below.

The two-level image data Bi of each color component stored in the buffer memory has a value equal to either 0 or 1 wherein 0 corresponds to white and 1 to black. Bi=0 corresponds to multilevel data equal to 0, and Bi=1 corresponds to 255.

If Bi is converted to multilevel data which is different from the original multilevel data and if the resultant multilevel data is again input to the error addition circuit 108 and the binarization circuit 109, then the spatial density distribution of dots is changed and thus the color tone of the printed image is changed.

That is, when the color tone is modified, the two-level data Bi read from the buffer memory 113 is converted by the color correction circuit 114 not to a normal value equal to either 0 or 255, but to multilevel data which is different by an amount corresponding to the amount by which the color tone is to be changed. The obtained multilevel data is transferred to the binarization circuit 109 via the selector 107 and binarized again.

The color represented by two-level signals of four color component signals M, C, Y, and Bk are determined by a combination of 0's and 1's of these four image signals. The number of combinations of two-level signals of four colors is equal to $2^4$ or 16. That is, a full color image is reproduced using these sixteen colors. All possible combinations of two-level signals of four colors are listed below in Table 1.

TABLE 1

| No. | M | C | Y | Bk |
|---|---|---|---|---|
| 1 | 0 | 0 | 0 | 0 |
| 2 | 1 | 0 | 0 | 0 |
| 3 | 0 | 1 | 0 | 0 |
| 4 | 0 | 0 | 1 | 0 |
| 5 | 1 | 1 | 0 | 0 |
| 6 | 1 | 0 | 1 | 0 |
| 7 | 0 | 1 | 1 | 0 |
| 8 | 1 | 1 | 1 | 0 |
| 9 | 0 | 0 | 0 | 1 |
| 10 | 1 | 0 | 0 | 1 |
| 11 | 0 | 1 | 0 | 1 |
| 12 | 0 | 0 | 1 | 1 |
| 13 | 1 | 1 | 0 | 1 |
| 14 | 1 | 0 | 1 | 1 |
| 15 | 0 | 1 | 1 | 1 |
| 16 | 1 | 1 | 1 | 1 |

When the color of the output image is adjusted so that for example, the red component is slightly enhanced, the adjustment is performed as follows. In Table 1, those combinations of color signals which reproduce red are Nos. 6 and 14. Thus, when a combination of two-level color signals M, C, Y, and Bk is equivalent to either No. 6 or 14, the output signal is set not to 255 but to a greater value (such as 300).

Thus the parameters of the color correction circuit 114 are set so that the multilevel signal output from the color correction circuit 114 corresponds to one of sixteen two-level signals as represented in Table 2.

In the present example, only M and Y signals having a value of 255 in the normal state are converted to 300.

TABLE 2

| No. | M | C | Y | Bk |
|---|---|---|---|---|
| 1 | 0 | 0 | 0 | 0 |
| 2 | 255 | 0 | 0 | 0 |
| 3 | 0 | 255 | 0 | 0 |
| 4 | 0 | 0 | 255 | 0 |
| 5 | 255 | 255 | 0 | 0 |
| 6 | 300 | 0 | 300 | 0 |
| 7 | 0 | 255 | 255 | 0 |
| 8 | 255 | 255 | 255 | 0 |
| 9 | 0 | 0 | 0 | 255 |
| 10 | 255 | 0 | 0 | 255 |
| 11 | 0 | 255 | 0 | 255 |
| 12 | 0 | 0 | 255 | 255 |
| 13 | 255 | 255 | 0 | 255 |
| 14 | 300 | 0 | 300 | 255 |
| 15 | 0 | 255 | 255 | 255 |
| 16 | 255 | 255 | 255 | 255 |

The color correction circuit 114 can be easily realized for example with a look-up table representing the relationship between input signals each consisting of four bits representing M, C, Y, and Bk, respectively, and multilevel output signals.

The multilevel signal Gr obtained in the above process is sent to the selector 107.

The multilevel signal is passed through the error addition circuit and the binarization circuit, and converted to two-level data corresponding to either 0 or 255. If the multilevel signal Gr is for example equal to 300, then the error produced in the binarization process becomes as follows:

300−255=45

This positive error is distributed to neighboring pixels via the error memory. Therefore, when the pixel of interest includes a color component M or Y, white pixels in the neighborhood (Bi=0) tend to be converted to a color pixel (Bi=1) in the binarization process. As a result, the density of M and Y dots increases. That is, the red component is enhanced over the entire image.

Conversely, when it is desired to decrease the red component, the color correction circuit 114 is set such that when a color component signal M or Y is given, a multilevel signal having a value smaller than 255 is output. In this case, the density of dots of color components M and Y decreases, and thus the red component becomes lower over the entire image.

In response to an instruction given via a control panel 117, the look-up table is modified and set so that the color correction circuit 114 outputs multilevel signals corresponding to the desired modification of the color tone, thereby ensuring that the color tone represented by the two-level data is modified by the desired amount.

MODIFICATION OF THE FIRST EMBODIMENT

Figure 3:
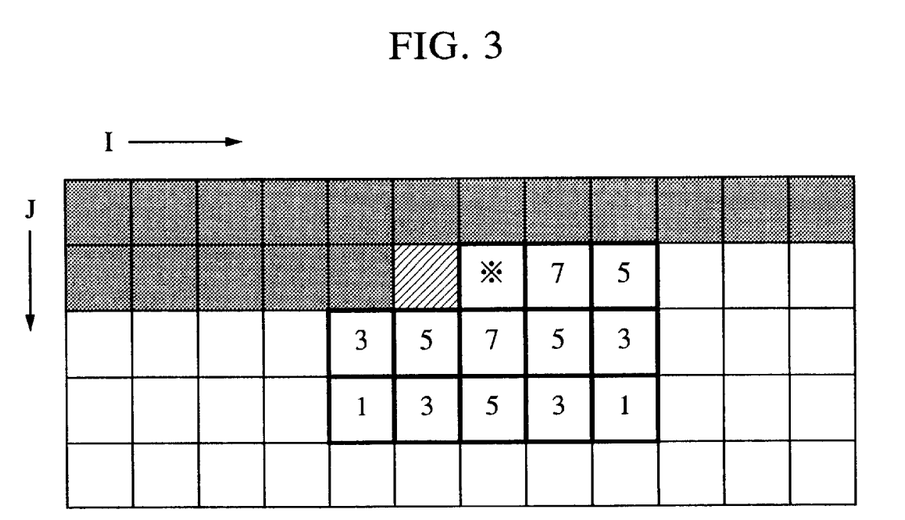
FIG. 3 is a schematic diagram illustrating an example of an error distribution matrix based on an error diffusion method.

Although not described in the above embodiment, the binarization based on the error diffusion method is usually performed using an error distribution matrix such as that shown in FIG. 3.

When multilevel image data in the form of a two-dimensional array is binarized, binarization starts at the top and left of FIG. 3 and proceeds in a right and lower direction. In the binarization process, a binarization error produced when a pixel of interest (denoted by a symbol ⊗) is binarized is weighted by a proper factor and distributed to neighboring pixels.

In the binarization process, the multilevel data is scanned from one pixel to another pixel in the I direction in FIG. 3. If the scanning reaches the end of the line in the I direction, the scanning is restarted at the left end of the next line. In the example shown in FIG. 3, the shaded pixels have been already binarized, and the pixel denoted by the symbol ⊗ is now under binarization process. As described in the first embodiment, the binarization is performed on the pixel of interest on the basis of the sum of the original multilevel data of the pixel of interest and the error distributed from the already-binarized pixels to that pixel. As a result of this binarization, another binarization error E is generated.

The binarization error E is distributed to pixels (surrounded by thick lines in FIG. 3) in the neighborhoods of the pixel of interest wherein the error is weighted by a proper factor depending on the neighboring pixels. For example, the next pixel at the right side has a weight of 7, and thus E×7/48 is added as error data to the next pixel at the right side, wherein 48 is a normalization factor which is equal to the sum of all weighting factors shown in FIG. 3.

The error distribution matrix is determined so that a given multilevel signal is converted to a two-level signal in a desirable fashion in particular in terms of the smooth halftone and the high resolution of character images.

However, when the two-level data stored in the memory is converted to multilevel data different from the original multilevel data and converted again to two-level data, if the same distribution matrix as that shown in FIG. 3 is used, dots of the same color can appear in an unnatural fashion or an undesirable texture can appear.

Figure 4:
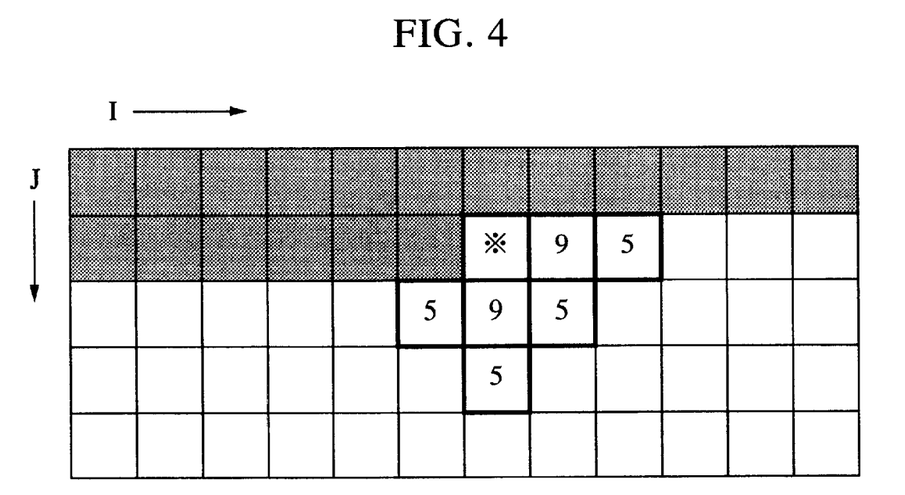
FIG. 4 is a schematic diagram illustrating another example of an error distribution matrix based on an error diffusion method.

To avoid the above problem, a matrix such as that shown in FIG. 4 is employed in the operation mode in which the two-level image stored in the memory is rebinarized.

When the matrix shown in FIG. 4 is employed, the error is distributed to a less number of neighboring pixels, and greater weighting factors are given to the errors added to the immediately neighboring pixels.

The setting of the matrix is performed by the CPU 115 shown in FIG. 1. When the operation is performed in the mode in which an image is printed using the data stored in the memory, the CPU 115 switches not only the selector 107 and the switch 112 to corresponding positions but also the error distribution matrix 111 to one corresponding to the mode. That is, in the mode in which the multilevel image data sensed via the CCD is directly output or stored in the memory, the matrix shown in FIG. 3 is employed. On the other hand, in the mode in which the two-level data stored in the memory is output, the matrix shown in FIG. 4 is employed.

By selecting a proper error diffusion matrix depending on the operation mode, it is possible to prevent an undesirable texture from appearing in the rebinarization mode. Thus a high-quality image is output regardless of the operation mode.

SECOND EMBODIMENT

In the first embodiment, the method of modifying the color tone is described. However, the overall density may also be corrected without changing the color tone. Furthermore, the number of color dots constituting one pixel may also be modified.

The correction of the number of color dots is required for the following reason. In general, color printers have a limitation on the number of color dots included in one pixel. For example, if the color components Y, M, C, and Bk of a certain pixel are all equal to 1, then tonor images of all color components Y, M, C, and Bk appear at the same pixel. This can cause toner to be scattered around that pixel, thus bringing about significant degradation in the print quality.

A similar problem can occur in ink-jet printers. In this case, ink expands around pixels, thus resulting in degradation in the print quality.

In this second embodiment, there is disclosed a method of correcting the color tone depending on the number of color dots included in one pixel. The same apparatus as that employed in the first embodiment may be employed in this second embodiment.

The look-up table associated with conversion to multi-level data is set in the color correction circuit 114 as shown in Table 3.

TABLE 3

| No. | M | C | Y | Bk |
|---|---|---|---|---|
| 1 | 0 | 0 | 0 | 0 |
| 2 | 255 | 0 | 0 | 0 |
| 3 | 0 | 255 | 0 | 0 |
| 4 | 0 | 0 | 255 | 0 |
| 5 | 255 | 255 | 0 | 0 |
| 6 | 255 | 0 | 255 | 0 |
| 7 | 0 | 255 | 255 | 0 |
| 8 | 100 | 100 | 100 | 100 |
| 9 | 0 | 0 | 0 | 255 |
| 10 | 255 | 0 | 0 | 255 |
| 11 | 0 | 255 | 0 | 255 |
| 12 | 0 | 0 | 255 | 255 |
| 13 | 255 | 255 | 0 | 255 |
| 14 | 255 | 0 | 255 | 255 |

TABLE 3-continued

| No. | M | C | Y | Bk |
|-----|-----|-----|-----|-----|
| 15 | 0 | 255 | 255 | 255 |
| 16 | 100 | 100 | 100 | 255 |

In this specific example, the multilevel signals corresponding to two-level signals including three or more 1's in the combination of color components, as is the case in Nos. 8 and 16, are corrected so that the sum of color component signals becomes less than a predetermined value. It the corrected multilevel signals are again binarized, then the color dots concentrated at particular pixels are spatially scattered thus preventing the above problem.

That is, in the present embodiment, the look-up table is modified so that the sum of color component signals of the multilevel data of any pixel becomes less than the predetermined value, thereby ensuring that color dots are prevented from being concentrated at particular pixels and thus the recording material is prevented from being scattered.

In the case where the look-up table is set in accordance with an instruction given by a user through the control panel as described above in the first embodiment, the look-up table may also be set so that the sum of color component signals of one pixel becomes less than the predetermined value thereby ensuring that a desired color tone correction is made while preventing the recording material from being scattered.

Furthermore, in a printer of the type in which two-level color data represented in a PDL language is received from a host computer or the like via an external interface and an image is formed in accordance with the received data, the process according to the present embodiment may also be employed to suppress the total amount of a recording material in a fixed area to a particular level depending on the characteristics of the printer. In the case where two-level color data is sent from the host computer to a plurality of printers which are different in the capability associated with the maximum total amount of recording material in a fixed area, the technique according to the present embodiment allows the host computer to send the data without having to make a correction depending on the printer.

OTHER EMBODIMENTS

Although in the above embodiments, the input image data is converted to two-level data, the present invention may also be applied to the case where the input m-level data is converted (quantized) to n (n<m)-level data.

Furthermore, instead of employing the error diffusion method, other methods of converting the input data to n-level data may also be employed.

Furthermore, the invention also includes within its scope a system in which a software program is supplied to a computer (CPU or MPU) so that various devices are controlled by the computer in such a manner as to achieve the various functions required in the system.

In this case, it should be understood that the program code implements the functions of invention, and thus the program code and means for supplying the program code to the computer such as a storage medium storing the program code fall within the scope of present invention.

Storage media which can be preferably employed in the present invention to supply the program code include a floppy disk, hard disk, optical disk, magneto-optical disk, CD-ROM, magnetic tape, non-volatile memory card, and ROM.

In the case where the functions of any embodiment described above are realized by executing the program code on the computer which operates under the control of an OS (operating system) or in the case where the functions of any embodiment described above are realized by executing the program code in cooperation with another application software, the program code also falls within the scope of the invention.

The invention also includes within its scope a program code and a system in which the program code is stored in a memory provided on an extended board of a computer or in an extended unit connected to the computer. All or a part of the process is performed by a CPU located on the extended board or in the extended unit according to the program code.

As can be understood from the above description, the present invention has the advantage that excellent color reproduction is achieved regardless of whether the image is reproduced from m-level data or n-level data.

Furthermore, it is possible to make a desired color correction on the n-level data.

Although the present invention has described above with reference to specific embodiments, various modifications are possible without departing from the scope of the invention as defined by the appended claims.

What is claimed is:

1. An image processing method for performing correction in accordance with input color correction information of n-level color data, said method comprising the steps of:

inputting said color correction information;

setting data in a look-up table associated with conversion of the n-level color data to m-level color data, in accordance with the input color correction information;

converting the n-level data to m-level data by using the set look-up table; and performing quantization processing to the converted m-level data while preserving a density of an image in the quantization processing, wherein, when the input color correction information indicates that a color is to be enhanced, a data level of the look-up table corresponding to the color to be enhanced is set to more than m.

2. An image processing method according to claim 1, wherein the color correction information comprises color component information and correction amount information of the color component information.

3. An image processing method according to claim 2, wherein the set data in the look-up table are set so that a sum of color components of one pixel is equal to or less than a predetermined value.

4. An image processing method according to claim 3, wherein the predetermined value depends on characteristics of an outputting apparatus.

5. An image processing apparatus for performing correction in accordance with input color correction information of n-level color data, said processing apparatus comprising:

input means for inputting the color correction information;

setting means for setting data in a look-up table associated with conversion of the n-level color data to m-level color data, in accordance with the color correction information input by the input means;

conversion means for converting the n-level color data to m-level color data by using the set look-up table; and quantization means for performing quantization processing to the converted m-level data while preserving a density of an image in the quantization processing, wherein, when the input color correction information indicates that a color is to be enhanced, a data level of the look-up table corresponding to the color to be enhanced is set to more than m.

6. An image processing apparatus according to claim 5, further comprising input means that inputs the n-level color data from an external apparatus.

7. A storage medium storing program code to be executed by a computer for performing correction in accordance with input color correction information of n-level data, said program code being stored on said storage medium in such a manner that said program code can be read by the computer, said program code comprising:

code for inputting the color correction information;

code for setting data in a look-up table associated with conversion of the n-level color data to m-level color data, in accordance with the input color correction information;

code for converting the n-level color data to m-level color data by using the set look-up table; and code for performing quantization processing to the converted m-level data while preserving a density of an image in the quantization processing, wherein, when the input color correction information indicates that a color is to be enhanced, a data level of the look-up table corresponding to the color to be enhanced is set to more than m.

* * * * *

UNITED STATES PATENT AND TRADEMARK OFFICE
CERTIFICATE OF CORRECTION

PATENT NO. : 6,341,019 B1
DATED : January 22, 2002
INVENTOR(S) : Ohta

It is certified that error appears in the above-identified patent and that said Letters Patent is hereby corrected as shown below:

Column 1,
Line 55, "gray" should read -- grey --.

Column 3,
Line 3, "mannually" should read -- manually --.

Column 9,
Line 12, "It" should read -- If --; and
Line 61, "of" should read -- of the --.

Column 10,
Line 24, "has" should read -- has been --.

Signed and Sealed this

Eleventh Day of June, 2002

Attest:

Attesting Officer

JAMES E. ROGAN
Director of the United States Patent and Trademark Office